(12) United States Patent
Maki (10) Patent No.: US 8,378,994 B2
(45) Date of Patent: Feb. 19, 2013

(54) TOUCH SCREEN DEVICE AND PRODUCTION METHOD THEREOF

(75) Inventor: Tadashi Maki, Fukuoka (JP)

(73) Assignee: Panasonic Corporation, Osaka (JP)

( * ) Notice: Subject to any disclaimer, the term of this patent is extended or adjusted under 35 U.S.C. 154(b) by 305 days.

(21) Appl. No.: 12/977,218

(22) Filed: Dec. 23, 2010

(65) Prior Publication Data

US 2011/0163983 A1 Jul. 7, 2011

(30) Foreign Application Priority Data

Jan. 6, 2010 (JP) ................................. 2010-001096

(51) Int. Cl.
*G09G 5/00* (2006.01)

(52) U.S. Cl. ..................................... 345/174; 178/18.06

(58) Field of Classification Search .......... 345/173–179; 178/18.01–18.09
See application file for complete search history.

(56) References Cited

U.S. PATENT DOCUMENTS

| 4,686,332 A | 8/1987 | Greanias et al. |
| 2005/0211476 A1 | 9/2005 | Shi |
| 2009/0167721 A1 | 7/2009 | Hamm et al. |

FOREIGN PATENT DOCUMENTS

| JP | 7-281812 | 10/1995 |
| JP | 2002-342033 | 11/2002 |
| JP | 2009-037373 | 2/2009 |
| JP | 2009-070191 | 4/2009 |
| JP | 2009-86855 | 4/2009 |

OTHER PUBLICATIONS

United Kingdom Office action, mail date is Apr. 15, 2011.

*Primary Examiner* — Regina Liang
(74) *Attorney, Agent, or Firm* — Greenblum & Bernstein, P.L.C.

(57) ABSTRACT

A touch screen device includes a surface board on which a touch surface is provided. A plurality of first electrodes, extending parallel to each other, are provided on a surface of the surface board opposite to the touch surface. A plurality of second electrodes, extending parallel to each other, are provided such that the first electrodes and the second electrodes are arranged in a grid pattern. First and second protectors respectively protect the first electrodes and the second electrodes. The first protector is provided on a portion of the surface of the surface board on which the first electrodes are provided such that a space is provided between the first electrodes.

17 Claims, 7 Drawing Sheets

TOUCH SCREEN DEVICE AND PRODUCTION METHOD THEREOF

CROSS-REFERENCE TO RELATED APPLICATIONS

The present application claims priority under 35 U.S.C. §119 of Japanese Application No. 2010-001096, filed on Jan. 6, 2010, the disclosure of which is expressly incorporated by reference herein in its entirety.

BACKGROUND OF THE INVENTION

1. Field of the Invention

The present invention relates to a mutual-capacitance, projected-capacitive touch screen device that determines whether or not a touch is present based on an amount of change in a charge-discharge current at each intersection of electrodes arranged in a grid pattern, and a method of producing the touch screen device.

2. Description of Related Art

There are various types of touch screen devices. A capacitive touch screen device does not require an electronic pen including an oscillator or the like, and a touch operation on the capacitive touch screen device can be performed directly with a finger tip of a user or with a stylus simply made of a conductive material.

A projected capacitive touch screen device includes first electrodes and second electrodes arranged in a grid pattern, and uses a principle that capacitance of a capacitor provided at each intersection (hereinafter, referred to as an electrode intersection) of the first electrodes and the second electrodes varies with a close access or a contact of a conductive object (e.g., human body). A mutual-capacitance, projected-capacitive touch screen device detects whether a touch is present based on an amount of change in the charge-discharge current according to the change in capacitance at each electrode intersection, It is possible to perform multi-touch (or multi-point detection), which detects a plurality of touch positions simultaneously, in the mutual-capacitance, projected-capacitive touch screen device.

The projected capacitive touch screen device has a protective layer in which the first electrodes and the second electrodes are implanted, and a surface board with a touch surface is provided on a front surface side of the protective layer (see Related Arts 1 and 2).

The touch screen device is widely used in fields of personal computers or handheld terminals. On the other hand, a technology is known in which the touch screen device is used as an interactive whiteboard, by combining the touch screen device with a large screen display device to be used in a presentation or a lecture for a large audience (see Related Art 3).

Related Art 1: Japanese Patent Application Publication No. 2002-342033
Related Art 2: U.S. Pat. No. 4,686,332
Related Art 3: Japanese Patent Application Publication No. 2009-86855

When the mutual-capacitance, projected-capacitive touch screen device is used as an interactive whiteboard, overall capacitance between the first electrodes and the second electrodes increases, as the size of the touch screen device increases. For example, the capacitance exceeds 100 pF in the device having a 77 inch screen. On the other hand, the change in capacitance in accordance with a touch operation by a user's finger tip or a stylus is at most several 100 fF, and thus is very small. Accordingly, as the size of the touch screen device increases, a sufficient detection accuracy cannot be obtained.

SUMMARY OF THE INVENTION

In view of the above-described circumstances, the present invention provides a touch screen device that is capable of detecting touch positions with a high degree of accuracy even when the size of the touch screen panel is increased. The present invention further provides a method of producing such a touch screen device.

The present invention provides a touch screen device including: a surface board on which a touch surface is provided; a plurality of first electrodes extending parallel to each other, provided on a surface of the surface board opposite to the touch surface; a plurality of second electrodes extending parallel to each other, the first electrodes and the second electrodes being arranged in a grid pattern; and a first protector and a second protector that respectively protect the first electrodes and the second electrodes. The first protector is provided on a portion of the surface of the surface board on which the first electrodes are provided such that a space is provided between the first electrodes.

According to the features of the present invention, the space provides air, having a low electric permittivity (dielectric), interposed between the first electrodes extending parallel to each other. Accordingly, the electric capacity (parasitic capacity) between the first electrodes decreases. As a result, the overall electric capacity between the first electrodes and the second electrodes decreases when no touch operation is performed. Thus, the change in the electric capacity at the time of a touch operation is relatively increased, and the detection sensitivity of the touch operation can be increased.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

An embodiments of the present invention will be described hereinafter with reference to the drawings.

Figure 1:
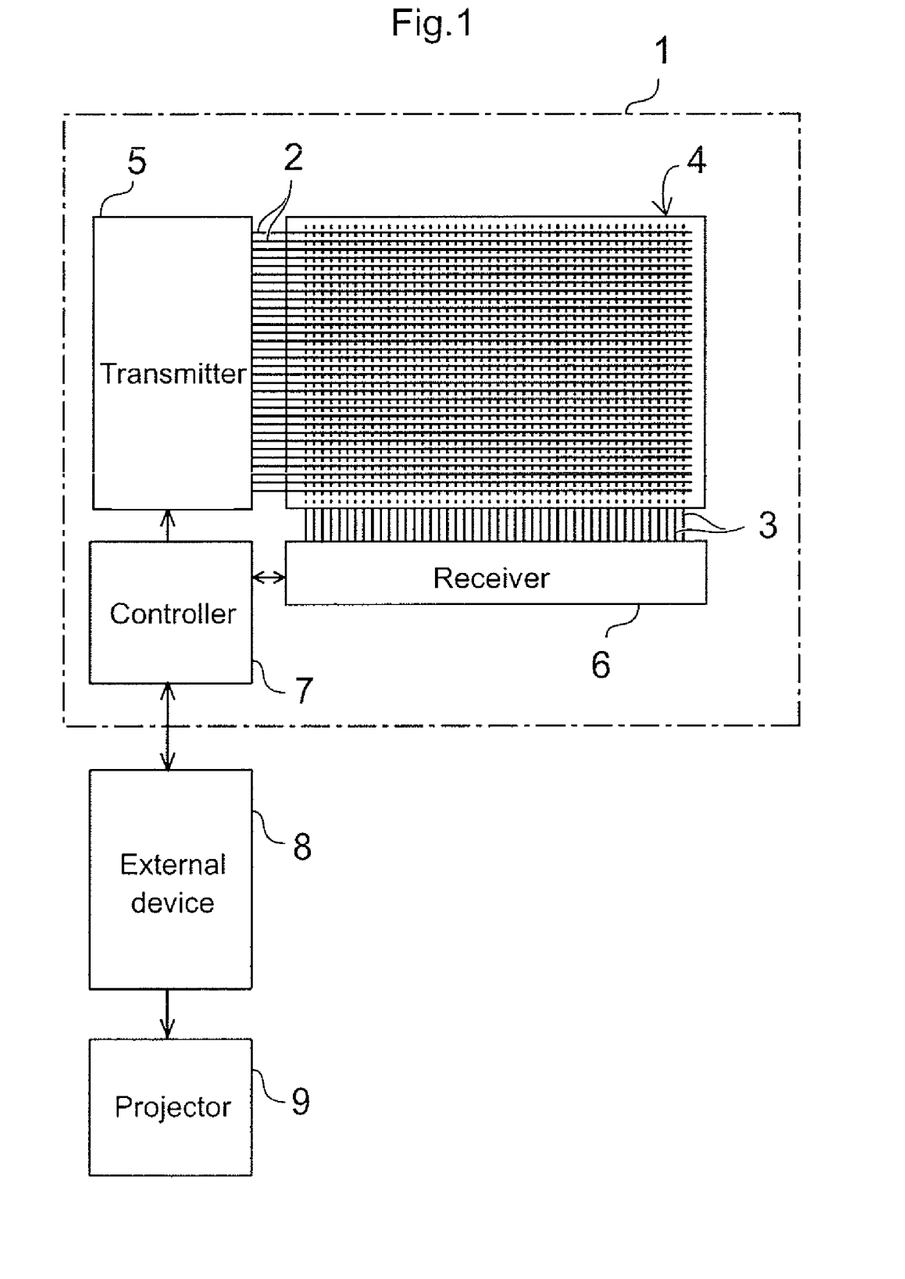
FIG. 1 is a schematic configuration diagram illustrating an entire touch screen device according to an embodiment of the present invention.

FIG. 1 is a configuration diagram illustrating an entire touch screen device according to the embodiment of the present invention. The touch screen device 1 includes a panel body 4, in which a plurality of transmission electrodes (e.g., 120 first electrodes) 2 extending parallel to each other and a plurality of receiving electrodes (e.g., 186 second electrodes) 3 extending parallel to each other are arranged in a grid pattern; a transmitter 5 that applies a drive signal (pulse signal) to each of the transmission electrodes 2; a receiver 6 that receives a charge-discharge current signal of each of the receiving electrodes 3 in response to the drive signal applied to each of the transmission electrodes 2, and outputs a level signal of each electrode intersection, at which each transmission electrode 2 intersects with each receiving electrode 3; and a controller 7 that detects a touch position based on the level signal output from the receiver 6, and controls operations of the transmitter 5 and the receiver 6.

The touch screen device 1, combined with a large screen device, is used as an interactive white board, which can be used in a presentation or a lecture. In particular, in this embodiment, the touch screen device 1 is used in combination with a projector device, and a touch surface of the touch screen device 1 is used as a screen for a projector.

Touch position information output from the touch screen device 1 is input to an external device 8, such as a personal computer, etc. An image corresponding to a user's touch operation performed on a touch surface of the touch screen device 1, with a pointing device (a user's finger tip or a conductive body, such as a stylus or a pointing rod, etc.), is displayed on a display screen, which is projected and displayed on the touch surface of the touch screen device 1 by a projector device 9, based on display screen data output from the external device 8. Thus, a desired image can be displayed in a manner such as to give rise to a feeling or impression similar to when the image is directly drawn on the touch surface of the touch screen device 1 by a marker. Further, a button displayed in the display screen can be operated. Moreover, an eraser, which erases the image drawn through a touch operation, can also be used.

The transmission electrodes 2 and the receiving electrodes 3 are arranged at a same arrangement pitch (e.g., 10 mm). A capacitor is formed at each electrode intersection at which each transmission electrode 2 intersects with each receiving electrode 3. When a user performs a touch operation with a pointing device, capacitance at the electrode intersection is substantially reduced in response to the touch operation, and thereby it is possible to detect whether or not a touch operation is performed.

In particular, in this embodiment, a mutual capacitance touch screen device is used. Thus, when a drive signal is applied to the transmission electrode 2, a charge-discharge current flows in the receiving electrode 3 in response to the drive signal. At this moment, when capacitance at an electrode intersection changes in response to a user's touch operation, the charge-discharge current in the receiving electrode 3 also changes. The receiver 6 converts an amount of change in the charge-discharge current into a level signal (digital signal) of each electrode intersection, and outputs the level signal to the controller 7. The controller 7 calculates a touch position based on the level signal of each electrode intersection. In the mutual capacitance touch screen device, it is possible to perform multi-touch (or multipoint detection), which detects a plurality of touch positions simultaneously.

The transmitter 5 selects the transmission electrodes 2 one by one and applies a drive signal to the selected electrode, in synchronization with a timing signal output from the controller 7. While the drive signal is applied to one transmission electrode 2, the receiver 6 selects the receiving electrodes 3 one by one, and receives the charge-discharge current from the selected receiving electrode 3. By doing so, a charge-discharge current of each and every electrode intersection can be obtained. For example, when a frame period, in which a receipt of the charge-discharge currents for all the electrode intersections (186×120=22320) is completed, is 10 ms, a drive signal output period for each of the 120 transmission electrodes 2 is about 83 µs.

The controller 7 obtains a touch position (a central coordinate of a touch area) from the level signal of each electrode intersection output from the receiver 6, using a predetermined operation or calculation. In the calculation of the touch position, the touch position is obtained from level signals of a plurality of electrode intersections (e.g. 4×4), which are adjacent to each other in the x-axis direction (the direction in which the transmission electrode 2 extends) and in the y-axis direction (the direction in which the receiving electrode 3 extends), by using a desired interpolating method (e.g., centroid method). Thus, it is possible to detect a touch position with a resolution (e.g., equal to or less than 1 mm) higher than the pitch (10 mm) of transmission electrodes 2 and the receiving electrodes 3.

Figure 2:
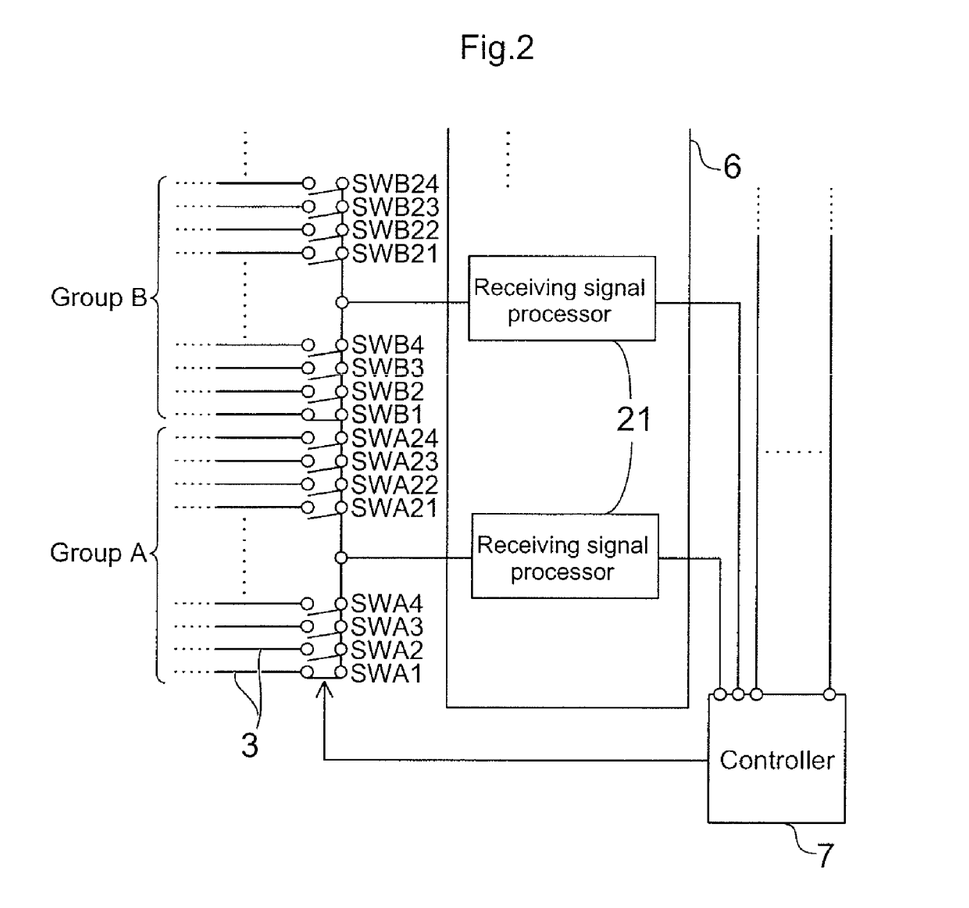
FIG. 2 is a schematic configuration diagram illustrating receiving electrodes and a receiver shown in FIG. 1.

FIG. 2 is a schematic configuration diagram illustrating the receiving electrodes 3 and the receiver 6 shown in FIG. 1. Each receiving electrode 3 is connected to a switching element (switch) SW, that switches ON and OFF an input of the charge-discharge current signal from the receiving electrode 3 to the receiver 6. The receiver 6 includes a receiving signal processor 21 that applies desired signal processing to the charge-discharge current signal input from the receiving electrode 3 via the switching element SW. On-off control is independently performed for each switching element SW, in accordance with a drive signal from the controller 7.

The receiving electrodes 3 and the switching elements SW are grouped together every predetermined number (e.g., 24), and on-off control of mutually corresponding switching elements SW included in respective groups is concurrently performed. Further, a receiving signal processor 21 is provided for each group. In each group, the switching elements SW are controlled to be turned ON one by one. The rest of the switching elements SW are controlled to remain OFF. The charge-discharge current signal of the single receiving electrode 3, selected by turning ON the corresponding switching element SW, is input to the receiving signal processor 21.

Thus, since the switching operations of the switching elements SW are concurrently performed for the plurality of groups, a period of time necessary to receive the charge-discharge current signals from all of the receiving electrodes 3 can be reduced. Further, since the processing of the charge-discharge current signals at the receiver 6 can be individually performed for each group, an increase in size of the hardware configuration can be reduced.

Further, in the grouping of the receiving electrodes 3, the number of receiving electrodes 3 in each group is not required to be the same. For example, when the total number of the receiving electrodes 3 is 186, each of seven groups A-G may include twenty four (24) electrodes, and the last group H may include 18 electrodes.

Figure 3:
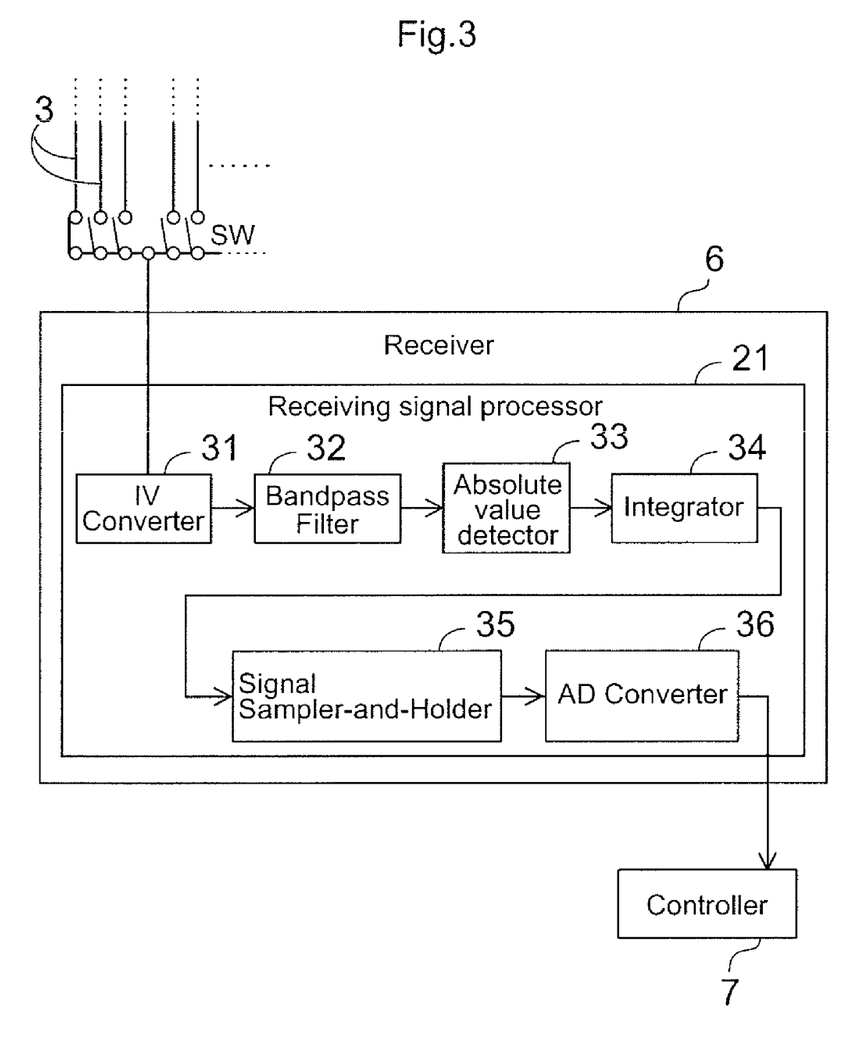
FIG. 3 is a schematic configuration diagram illustrating a receiving signal processor shown in FIG. 2.

FIG. 3 is a schematic configuration diagram illustrating the receiving signal processor 21 shown in FIG. 2. The receiving signal processor 21 includes an IV (current-to-voltage) converter 31, a bandpass filter 32, an absolute value detector 33, an integrator 34, a signal sampler-and-holder 35 and an AD converter 36.

The IV converter 31 converts the charge-discharge current signal (analog signal) of the receiving electrode 3, input through the switching element SW, into a voltage signal. The bandpass filter 32 performs an operation to remove a signal having a frequency component other than the frequency of the drive signal applied to the transmission electrode 2, from the output signals from the IV converter 31. The absolute value detector (rectifier) 33 applies a full-wave rectification to the output signals from the bandpass filter 32. The integrator 34 performs an operation to integrate the output signal from the absolute value detector 33 along the time axis. The signal sampler-and-holder 35 performs an operation to sample the output signal from the integrator 34 at a predetermined time. The AD converter 36 performs an AD conversion of the output signal from the signal sampler-and-holder 35, and outputs a level signal (digital signal).

Figure 4:
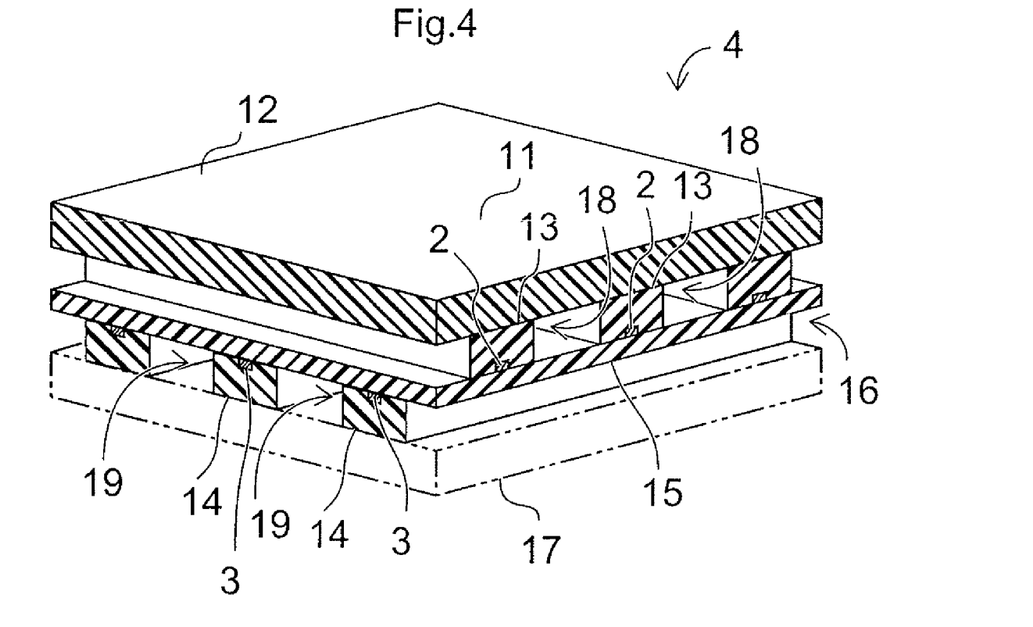
FIG. 4 is a schematic perspective view illustrating cross-sections of a panel body shown in FIG. 1.

FIG. 4 is a schematic perspective view illustrating cross-sections of a panel body 4 shown in FIG. 1. The panel body 4 includes a surface board 12, on which a touch surface 11 is provided, a first protector 13 that protects the transmission electrode 2, and a second protector 14 that protects the receiving electrode 3, and a support sheet 15 that supports the transmission electrodes 2, the receiving electrodes 3, and first and second protectors 13 and 14.

The transmission electrode 2 and the receiving electrode 3 are respectively provided on front and rear surfaces of the support sheet 15, which insulates the transmission electrode 2 from the receiving electrode 3. The transmission electrodes 2, the receiving electrodes 3, the first and second protectors 13 and 14, and the support sheet 15 are integrated to form an electrode sheet 16. A rear surface board 17 is provided on a rear side surface of the electrode sheet 16.

The first protector 13 is provided partially on the front surface side of the support sheet 15 such that a space 18 is formed between the transmission electrodes 2 extending in parallel to each other. The second protector 14 is provided partially on the rear surface side of the support sheet 15 such that a space 19 is formed between the receiving electrodes 3 extending in parallel to each other.

In particular, the first protector 13 is provided in a strip along each transmission electrode 2 to entirely cover the transmission electrode 2. The second protector 14 is provided in a strip along each receiving electrode 3 to entirely cover the receiving electrode 3. By doing so, since the protectors 13 and 14 entirely cover the electrodes 2 and 3, it is possible to avoid an electrical phenomenon, such as migration, etc., caused by exposing electrodes 2 and 3, or a breakage of the electrodes 2 and 3, which occurs when a large impact is applied to the touch surface 11 with a sharp device.

Further, the support sheet 15 is interposed between the transmission electrodes 2 and the receiving electrodes 3. The first protector 13 that protects transmission electrode 2 and the second protector 14 that protects the receiving electrode 3 are separated by the support sheet 15. The space 18 formed between the transmission electrodes 2 and the space 19 formed between the receiving electrodes 3 are separated by the support sheet 15. Accordingly, the spaces 18 and 19 can be provided in an appropriate condition. In other words, the spaces 18 and 19 extend along the transmission electrode 2 and the receiving electrode 3, respectively, and perpendicular to each other.

The surface board 12 is made of a synthetic resin material having flexibility, to be flexurally deformable by a touch operation. In particular, the synthetic resin material having a high electric permittivity (for example, relative permittivity of about 6) is used as the surface board 12 to increase a detection sensitivity of a touch operation by a pointing device. Further, the thickness of the surface board 12 can be about 1.2 mm, for example.

The transmission electrode 2 and the receiving electrode 3 have a thickness of about 10 μm, for example. The first and second protectors 13 and 14 respectively cover the transmission electrode 2 and the receiving electrode 3 with a thickness of about 20 μm, for example. The first protector 13 is made of a synthetic resin having ductility or flexibility, to be compressively deformable by a touch operation. The second protector 14 is also made of a material same as that of the first protector 13. An urethane resin is preferably used as the synthetic resin material of the protectors 13 and 14.

The transmission electrode 2 and the receiving electrode 3 can have a width of about 0.6 mm, for example. The first and second protectors 13 and 14 can have a width of about 6.5 mm, for example. The arrangement pitch of the transmission electrodes 2 and the receiving electrodes 3 can be about 10 mm, for example. Thus, the spaces 18 and 19 can have a width of about 3.5 mm.

The support sheet 15 is interposed between the transmission electrode 2 and the receiving electrode 3, and serves as an insulating layer that insulates the transmission electrode 2 from the receiving electrode 3. The support sheet 15 is made of a synthetic resin material having a high insulation property. PET (Polyethylene terephthalate) may be preferably used as the synthetic resin material of the support sheet 15. Further, the electric capacity of the capacitor formed at the electrode intersection can be controlled by the thickness of the support sheet 15. The thickness of the support sheet 15 may preferably be about 0.1-0.2 mm, for example.

Figure 5A:
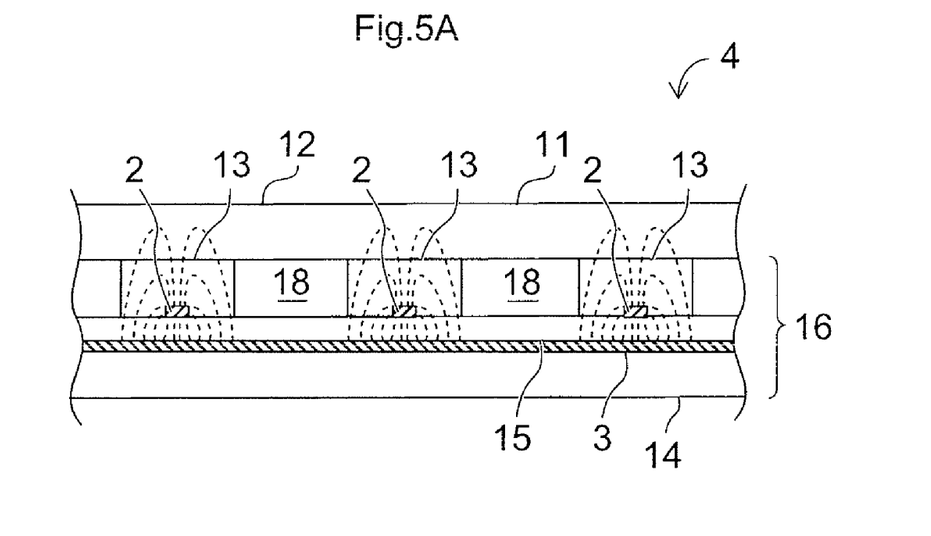
FIGS. 5A and 5B are schematic cross-sectional views, each illustrating a state of an electrical field formed in the panel body shown in FIG. 4.
Figure 5B:
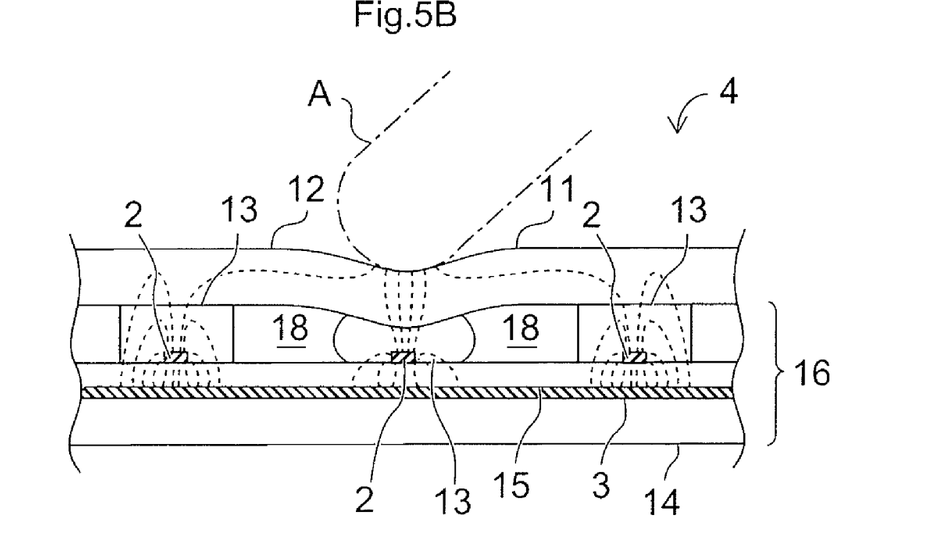

FIGS. 5A and 5B are schematic cross-sectional views, each illustrating a state of an electrical field formed in the panel body 4 shown in FIG. 4. FIG. 5A shows an initial state, and FIG. 5B shows a state when a touch operation is performed with a pointing device (a finger tip of a user, or a conductive body, such as a stylus or a pointing bar, etc.) A.

As shown in FIG. 5B, when a touch operation is performed with a pointing device A, capacitive coupling occurs between the pointing device A and the transmission electrode 2. Therefore, an overall electric capacity C between the transmission electrodes 2 and the receiving electrodes 3 is reduced by an amount of ΔC. As described above, when a drive signal (pulse signal) is applied to the transmission electrode 2, a charge-discharge current is generated in the receiving electrode 3, and the touch position is detected based upon an amount of variation in the charge-discharge current. The amount of variation in the charge-discharge current at the time of touch operation changes in accordance with the change ΔC in the electric capacity. The detection sensitivity of the touch operation depends on a ratio ΔC/C of the change ΔC in the electric capacity at the time of touch operation to the overall electric capacity C.

In this embodiment, the space 18 is provided between adjacent transmission electrodes 2. Due to the space 18, air having a low electric permittivity (dielectric) is interposed between the adjacent transmission electrodes 2. Accordingly, the electric capacity (parasitic capacity) between the adjacent transmission electrodes 2 decreases. Further, the space 19 is also provided between adjacent receiving electrodes 3. Due to the space 19, air having a low electric permittivity is interposed between the adjacent receiving electrodes 3. Accordingly, the electric capacity (parasitic capacity) between adjacent receiving electrodes 3 decreases. As a result, the overall electric capacity C between the transmission electrodes 2 and the receiving electrodes 3 decreases when no touch operation is performed. Thus, the change ΔC in the electric capacity at the time of a touch operation is relatively increased. In other words, since ΔC/C increases, the detection sensitivity of the touch operation can be increased.

Further, as described above, the surface board 12 is made of a synthetic resin material having flexibility, to be flexurally deformable by a touch operation, and the first protector 13 is made of a synthetic resin material having ductility, to be compressively deformable by a touch operation. Further, since the spaces 18 are provided such that the first protector 13 are formed partially on the rear surface side of the surface board 12, the surface board 12 becomes more flexible. Accordingly when a touch operation is performed with a pointing device A, the surface board 12 is bent and the first protector 13 is compressively deformed. As a result, since the distance between the pointing device A and the transmission electrode 2 is reduced, the change ΔC in the electric capacity caused by a touch operation increases, and thus the detection sensitivity of a touch operation can be further improved.

In order to reduce the distance between the pointing device A and the transmission electrode 2 by the touch operation, at least the first protector 13, which is positioned on the front surface side in the first and second protectors 13 and 14, should be made of a synthetic resin material having ductility, to be compressively deformable by a touch operation. The second protector 14 is not required to have such ductility, but may have such ductility.

Figure 6A:
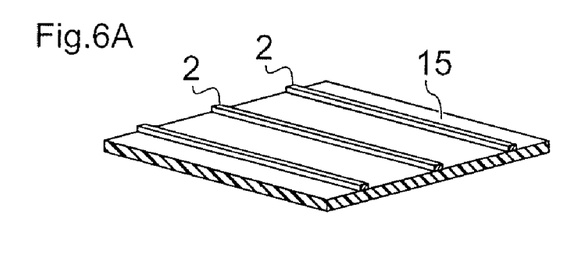
FIGS. 6A-6F are perspective views illustrating a process of producing the panel body shown in FIG. 4.
Figure 6B:
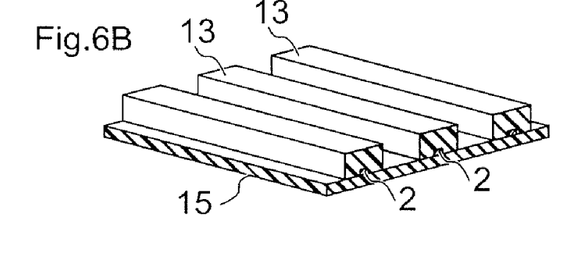
Figure 6C:
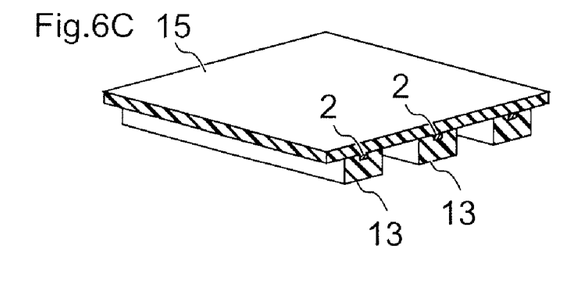
Figure 6D:
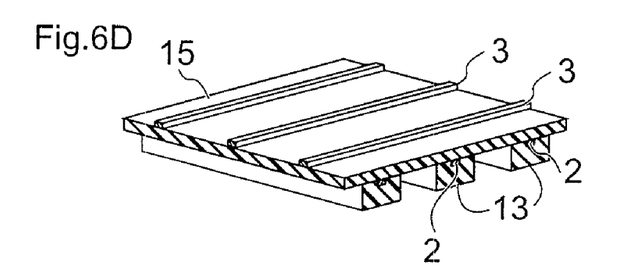
Figure 6E:
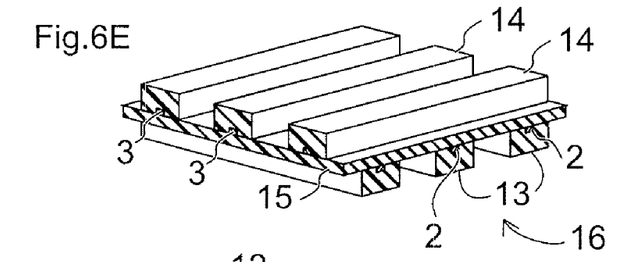
Figure 6F:
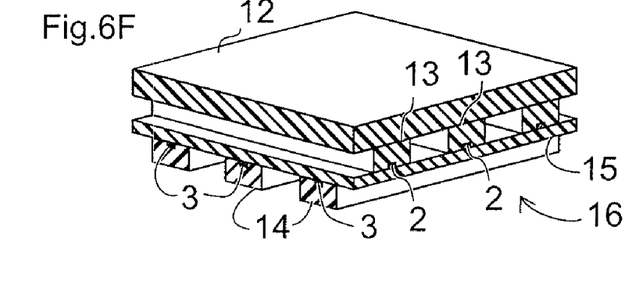

FIGS. 6A-6F are perspective views illustrating a process of producing the panel body 4 shown in FIG. 4. In this embodiment, the production process includes following processes. That is, the transmission electrodes 2 are formed by attaching an electrode formation material in lines on one surface of the support sheet 15, as shown in FIG. 6A. The first protectors 13 are formed by attaching a protector formation material in strips on the surface of the support sheet 15 to cover the respective transmission electrodes 2, as shown in FIG. 6B. The support sheet 15 is turned upside down, as shown in FIG. 6C. The receiving electrodes 2 are formed by attaching an electrode formation material in lines on the other surface of the support sheet 15, as shown in FIG. 6D. The second protectors 14 are formed by attaching a protector formation material in strips on the other surface of the support sheet 15 to cover the respective receiving electrodes 3 in order to obtain the electrode sheet 16, as shown in FIG. 6E. The electrode sheet 16 is turned over and the electrode sheet 16 and the surface board 12 are pasted together, as shown in FIG. 6F.

In each of the process forming the transmission electrodes 2, as shown in FIG. 6A; the process forming the first protectors 13, as shown in FIG. 6B; the process forming the receiving electrodes 3, as shown in FIG. 6D; and the process forming the second protectors 14, as shown in FIG. 6E, a baking process is performed to facilitate curing of the electrode formation material and the protector formation material attached to the support sheet 15 by heating. In addition, in order to reduce the change in size of the support sheet 15 made of PET by the baking process, a pre-baking process may be performed for contracting the support sheet 15 in advance by heating, before the process shown in FIG. 6A begins.

The electrode formation material and the protector formation material are attached to the support sheet 15 by screen printing. In the screen printing, a printing screen is used, which is a mesh on which a mask of a pattern corresponding to the electrodes 2 and 3, and the protectors 13 and 14 is provided. By sliding a squeegee on the printing screen, the electrode formation material and the protector formation material on the printing screen are transferred on the support sheet 15 positioned under the print screen. Since the screen printing can easily cope with an increase in size, and can increase productivity, a manufacturing cost can be reduced.

The electrode formation material forming the electrodes 2 and 3 is conductive ink, which includes a conductive filler, such as metal powder, providing electrical conductivity; a binder resin, which equally disperses the conductive filler; an organic solvent to obtain a fluidity appropriate for the screen printing; a pigment to confirm an attached state, and so on. An Ag (silver) paste, using Ag as the conductive filler, may be preferably used as the electrode formation material.

The protector formation material forming the protectors 13 and 14 may include a synthetic resin having desired ductility in a cured state, an organic solvent to obtain a fluidity appropriate for screen printing, a pigment to confirm an attached state, and so on. As described above, urethane resin may be preferably used as the synthetic resin for the protector formation material.

In order to increase the detection sensitivity, it is preferable to reduce the width of the protectors 13 and 14 and to increase the width of spaces 18 and 19. However, in the production process, occurrence of positional misalignment between the electrodes 2 and 3 and the protectors 13 and 14 is unavoidable. Therefore, in order to produce a state in which the electrodes 2 and 3 are completely covered by the protectors 13 and 14, the width of the protectors 13 and 14 is required to be a sufficiently broad, compared to the width of the electrodes 2 and 3. From this point of view, as described above, when the width of the electrodes 2 and 3 is about 0.6 mm, the width of the protectors 13 and 14 is set to be about ±6.5 mm. In other words, it may be preferable to produce the protectors 13 and 14 to have a width of ±3.25 mm from the center line of the electrodes 2 and 3 in the direction in which the electrodes extend.

Figure 7:
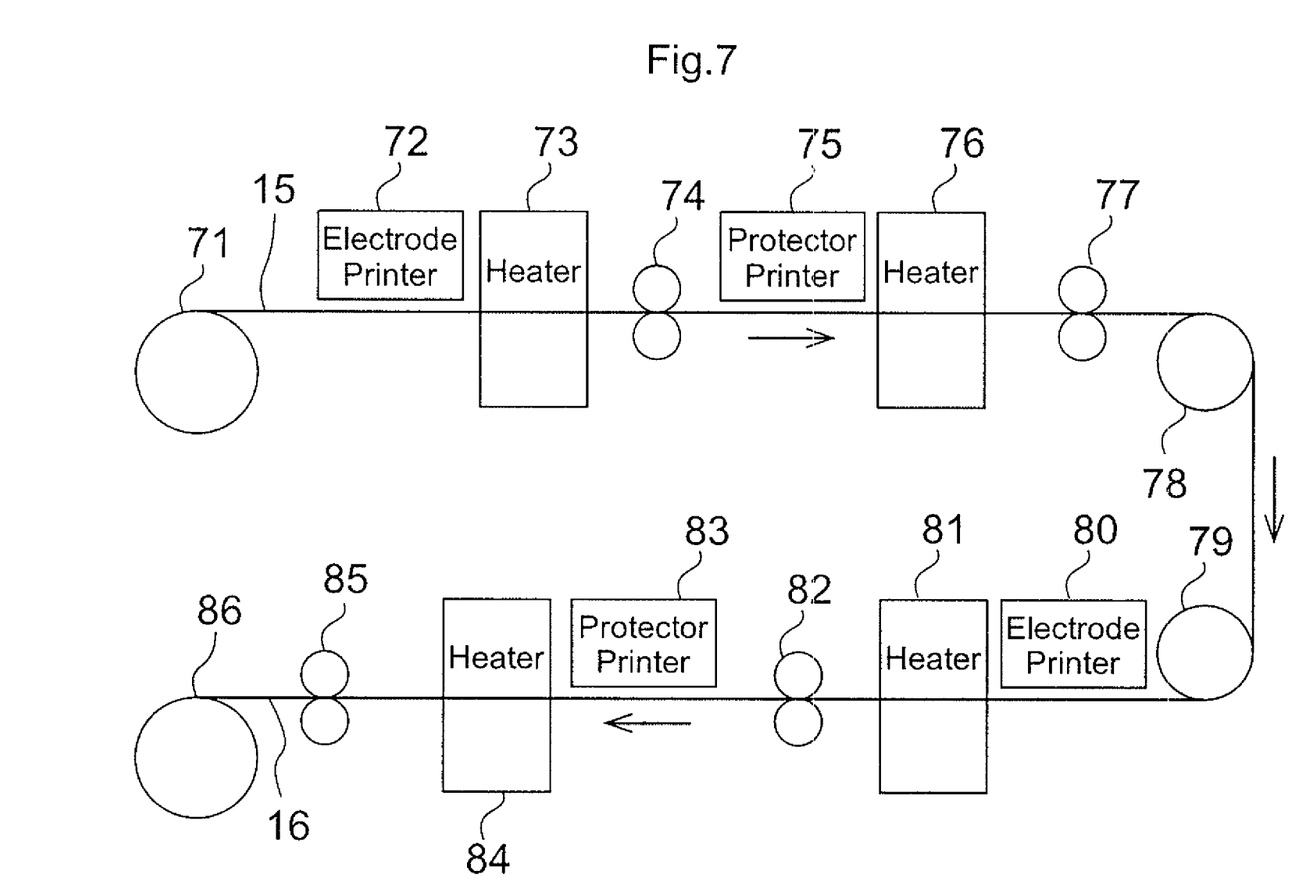
FIG. 7 is a schematic view illustrating a production device of an electrode sheet shown in FIG. 4.

FIG. 7 is a schematic view illustrating a production device of the electrode sheet 16 shown in FIG. 4. In this embodiment, a roll-to-roll process is used, in which the support sheet 15 is reeled out from a roll 71 of the support sheet 15, the electrodes 2 and 3 and the protectors 13 and 14 are sequentially formed thereon, and the resulting electrode sheet 16 is reeled on a roll 86. In the upper stage, an electrode printer 72, a heater 73, a protector printer 75, and a heater 76 are provided in series along the feeding direction. Similarly, in the lower stage, an electrode printer 80, a heater 81, a protector printer 83, and a heater 84 are provided in series along the feeding direction.

At the electrode printer 72, a process to attach lines of the electrode formation material, forming the transmission electrodes 2, on a surface of the support sheet 15 is performed. At the protector printer 75, a process to attach strips of the protector formation material, forming the first protectors 13, on the one surface of the support sheet 15 is performed to cover the transmission electrodes 2. At the electrode printer 80, a process to attach lines of the electrode formation material, forming the receiving electrodes 3, on the other surface of the support sheet 15 is performed. At the protector printer 83, a process to attach strips of protector formation material, forming the second protectors 14, on the other surface of the support sheet 15 is performed to cover the receiving electrodes 3.

At the electrode printers 72 and 80 and the protector printers 75 and 83, the processes to attach the electrode formation material and the protector formation material on the support sheet 15 are performed by screen printing. The heaters 73, 76, 81 and 84 perform a baking process that facilitates curing of the electrode formation material and the protector formation material attached on the support sheet 15. In order to reduce the change in size of the support sheet 15 made of PET by the baking process, it may be preferable to perform a pre-baking process that heats and contracts the roll 71 of the support sheet 15 in advance. In the stages following the heaters 73, 76, 81 and 84, pressure rollers 74, 77, 82 and 85 are provided, respectively. A process for compressing and fixing the electrode formation material and the protector formation material attached to the support sheet 15 is performed by the pressure rollers 74, 77, 82 and 85.

In the screen printing, the support sheet 15 is positioned under the print screen, and the electrode formation material and the protector formation material provided on the print screen is transferred onto the support sheet 15. Therefore, a process for turning the support sheet 15 upside down, as shown in FIG. 6C, is required. According to the roll-to-roll process as shown in FIG. 7, however, the support sheet 15 can be turned upside down by changing the direction of the support sheet 15 by the feed rollers 78 and 79, and conveying the support sheet 15 in opposite directions between the upper stage and the lower stage.

The electrode sheet 16 produced by the roll-to-roll process as shown in FIG. 7 is cut into a desired size, and is pasted on the surface board 12. Alternatively, the electrode sheet 16 having a desired size may be produced one by one. In this case, the support sheet 15 is cut into a desired size, and fixed to a frame. Then, in this state, each process shown in FIGS. 5A-5F may be performed.

Further, in the above-described embodiment, screen printing is used to attach the electrode formation material forming the electrodes 2 and 3 and the protector formation material forming the protectors 13 and 14 on the support sheet 15 in a predetermined pattern. However, an inkjet process, a nozzle printing process or another process may be used, instead.

Further, in the above-described embodiment, the transmission electrodes 2 and the receiving electrodes 3 are respectively provided on front and rear surfaces of the support sheet 15. However, it is sufficient that the transmission electrodes 2 and the receiving electrodes 3 are insulated from each other. Therefore, for example, both may be provided on one surface of the support sheet 15 with an insulation layer therebetween. Further, instead of separately providing an insulation member, the protectors, which protect the transmission electrodes 2 and the receiving electrodes 3, may serve as the insulation layer, and the transmission electrodes 2 and the receiving electrodes 3 may be insulated from each other by the protectors.

Further, in the above-described embodiment, the strip-shaped protectors 13 and 14 are provided along the electrodes 2 and 3 to cover the entire electrodes 2 and 3. However, the protectors may cover only a part of the electrodes. For example, it is possible to arrange the strip-shaped protectors to extend in a direction perpendicular to the direction in which the electrodes extend. However, in view of the circumstances that may be caused by exposing the electrodes, it is preferable that the entire electrodes are covered by the protectors.

The touch screen device and the production method thereof according to the features of the present invention have an advantageous effect that a touch position can be detected with a high degree of accuracy, even if the size of the touch screen device is increased. Thus, the touch screen device and the production method thereof according to the features of the present invention are useful as a touch screen device including a surface board, on which a touch surface is provided, a plurality of electrodes provided on the rear surface side of the surface board, and a protector that protects the electrodes, and a production method thereof.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A touch screen device comprising:
   a surface board on which a touch surface is provided;
   a plurality of first electrodes extending parallel to each other, provided on a surface of the surface board opposite to the touch surface;
   a plurality of second electrodes extending parallel to each other provided on a side of the first electrodes opposite to the surface board, the first electrodes and the second electrodes being arranged in a grid pattern;
   a plurality of first protectors and a plurality of second protectors that respectively protect the first electrodes and the second electrodes; and
   a support sheet that support the first electrodes, the second electrodes, the first protectors and the second protectors;
   wherein the first protectors extend parallel to each other at intervals such that spaces are provided between the first electrodes
   and the second protectors extend parallel to each other at intervals such that spaces are provided between the second electrodes.

2. The touch screen device according to claim 1, wherein the first protectors are provided on a front surface of the support sheet.

3. The touch screen device according to claim 2, wherein the second protectors are provided on a rear surface of the support sheet.

4. The touch screen device according to claim 2, wherein the first electrodes and the second electrodes are respectively provided on the front surface and the rear surface of the support sheet.

5. The touch screen device according to claim 4, wherein the support sheet insulates the first electrodes and the second electrodes.

6. The touch screen device according to claim 4, wherein the first protectors and the second protectors are provided as strips along the first electrodes and the second electrodes, to cover the first electrodes and the second electrodes entirely.

7. The touch screen device according to claim 1, wherein the surface board comprises a synthetic resin material having flexibility, to be flexurally deformable by a touch operation.

8. The touch screen device according to claim 7, wherein the synthetic resin material has a relative permittivity of approximately 6.

9. The touch screen device according to claim 7, wherein the first protectors comprise a synthetic resin material having ductility, to be compressively deformable by the touch operation.

10. The touch screen device according to claim 9, wherein the synthetic resin material is an urethane resin.

11. The touch screen device according to claim 5, wherein the support sheet comprises a synthetic resin material.

12. The touch screen device according to claim 11, wherein the synthetic resin material is polyethylene terephthalate.

13. A method for producing a touch screen device that includes a surface board on which a touch surface is provided; a plurality of first electrodes extending parallel to each other, provided on a surface of the surface board opposite to the touch surface; a plurality of second electrodes extending parallel to each other provided on a side of the first electrodes opposite to the surface board, the first electrodes and the second electrodes being arranged in a grid pattern; a plurality of first protectors and a plurality of second protectors that respectively protect the first electrodes and the second electrodes; and a support sheet that supports the first electrodes, the second electrodes, the first protectors and the second protectors, the method comprising:

forming the first electrodes by attaching lines of an electrode formation material on a surface of the support sheet;

forming the first protectors by attaching strips of a protector formation material at intervals on the surface of the support sheet to cover each of the first electrodes such that spaces are provided between the first electrodes;

forming the second electrodes by attaching lines of an electrode formation material on another surface of the support sheet;

forming the second protectors by attaching strips of a protector formation material at intervals on the other surface of the support sheet to cover each of the second electrodes such that spaces are provided between the second electrodes; and attaching an electrode sheet, which is obtained by forming the first electrodes, the second electrodes, the first protector and the second protectors on the support sheet, to the surface board.

14. The method for producing the touch screen device according to claim 13, wherein screen printing is used to form the electrode formation material and the protector formation material on the support sheet.

15. The method for producing the touch screen device according to claim 14, wherein a baking process is performed to facilitate curing of the electrode formation material and the protector formation material attached to the support sheet by heating.

16. The method for producing the touch screen device according to claim 13, wherein the electrode formation material comprises conductive ink.

17. The method for producing the touch screen device according to claim 16, wherein the conductive ink includes silver as a conductive filler.

\* \* \* \* \*